(12) United States Patent
Delarue

(10) Patent No.: US 7,555,498 B2
(45) Date of Patent: Jun. 30, 2009

(54) SERVER PROCESS FOR ACCESSING DATA FROM CLIENT PROCESSES

(75) Inventor: Guillaume Delarue, Courbevoie (FR)

(73) Assignee: Dassault Systemes, Suresnes Cedex (FR)

( * ) Notice: Subject to any disclaimer, the term of this patent is extended or adjusted under 35 U.S.C. 154(b) by 457 days.

(21) Appl. No.: 10/802,898

(22) Filed: Mar. 17, 2004

(65) Prior Publication Data

US 2005/0021861 A1    Jan. 27, 2005

(30) Foreign Application Priority Data

Mar. 20, 2003    (EP) .................................. 03290713

(51) Int. Cl.
*G06F 17/30* (2006.01)
(52) U.S. Cl. ...................... 707/103 R; 707/1
(58) Field of Classification Search .................... None
See application file for complete search history.

(56) References Cited

U.S. PATENT DOCUMENTS

| | | | | |
|---|---|---|---|---|
| 5,974,441 A * | 10/1999 | Rogers et al. | ............... | 709/200 |
| 6,362,836 B1 * | 3/2002 | Shaw et al. | .................. | 715/744 |
| 6,615,207 B1 * | 9/2003 | Lawrence | ....................... | 707/5 |
| 6,964,053 B2 * | 11/2005 | Ho et al. | ..................... | 719/319 |
| 6,965,925 B1 * | 11/2005 | Shank et al. | ................ | 709/219 |
| 2002/0103905 A1 | 8/2002 | Subramaniam | ............. | 709/225 |
| 2002/0116453 A1 * | 8/2002 | Todorov et al. | ............. | 709/203 |
| 2002/0194181 A1 * | 12/2002 | Wachtel | ....................... | 707/10 |

FOREIGN PATENT DOCUMENTS

EP    0 908 816    9/1998

OTHER PUBLICATIONS

Philippe Merle et al., "CorbaWeb: A Generic Object Navigator", *Computer Networks and ISDN Systems, North Holland Publishing*, vol. 28, No. 11. May 1, 1996, pp. 1269-1281.
Steve Vinoski, "CORBA: Integrating Diverse Applications within Distributed Heterogeneous Environments", *IEEE Service Center*, vol. 35, No. 2. Feb. 1, 1997, pp. 46-55.

* cited by examiner

*Primary Examiner*—Debbie M Le
(74) *Attorney, Agent, or Firm*—Isabel Cantallops; Baker & Hostetler LLP

(57) ABSTRACT

A computer system allows client processes to access data through a server process. The server process contains an application and a engine. The engine receives requests in a first language from one of the client processes and issues responses in the first language to the client process. The engine communicates with the application in a second language distinct from the first language, the second language being an object-oriented language. In the second language, objects have properties and associated with events. The application instantiates objects, evaluates properties of instantiated objects based on data and reacts to events. The engine issues responses in the first language to the client process according to the objects instantiated by the application and to their properties; the engine also provides updated properties and events to the application in the second language according to requests received in the first language from the client process.

24 Claims, 3 Drawing Sheets

SERVER PROCESS FOR ACCESSING DATA FROM CLIENT PROCESSES

CROSS-REFERENCE(S) TO RELATED APPLICATIONS

This application claims the benefit of the filing date of European Patent Application No. 03290713.1, which was filed on Mar. 20, 2003.

BACKGROUND OF THE INVENTION

The invention relates to the field of computer systems, and more specifically to server processes for allowing client processes to access data.

There exists a need to allow client processes executing on client computer systems to access data through a server process. This need arises for instance for servers offering information through the Internet to clients issuing queries in the html language. The server process hosted on the server needs to allow the client processes to access the requested information. FIG. 1 is a schematic view of the architecture of such a system. The server process 2 comprises data 4, to which access should be provided. The server process further comprises an application 6 and a engine 8. The engine may be one of several products sold on the market, such as provided under the trademark PHP by Apache Software Foundation, under the trademark ASP by Microsoft or under the trademark JSP by Sun Microsystems.

FIG. 1 further shows two client processes 10 and 12; in a generic case, the server process is hosted by one or more server machines, while each of the client process is hosted by a separate client machine. The client processes is a Web browser such the ones provided by Netscape Corp. under the trademark Navigator or by Microsoft Corp. under the trademark Internet Explorer. The client processes and the server process are connected, e.g. through a network using a protocol of the IP family. Client processes 10 and 12 communicate with the engine of the server process using html, dynamic html or other additional technologies such as activeX, Java applets, JavaScript (Trademark of Sun Microsystems, supplied by Web Browser such as Microsoft Internet Explorer, Netscape Navigator). For the sake of simplicity, html is taken as a generic example in further discussion in the specification.

The application 6 uses the same language for communicating with the engine. It may further use functions provided by the engine.

The operation of the system is the following. Client processes 10, 12 issue requests to the engine 8, in the html language. Requests from the various clients are passed by the engine 8 to the application 6, in the html language and possibly using additional functions specific to the engine. Requests from the engine are processed by the application 6, which accesses data 4 when necessary. Responses from the application are provided to the engine in the html language and are forwarded to client process.

In this type of architecture, applications may have limited portability as their design typically limits them to html clients (i.e., web browsers). Engines such as the ones listed above provide additional functions or libraries for facilitating development of applications; however, the basis for communication between applications and the engine-remains html. Thus, applications are necessarily specific to html clients and are not easily adapted to other types of clients. Thus, languages such as JSP, ASP or PHP are html-based and any application written in these languages will include html parts.

The need to allow access to data through a server process is also present for clients other than html clients. Dassault Systemes sells under the trademark CATIA a CAD product; a schematic view of the architecture of this product is shown in FIG. 2, in one example of a possible implementation of the product for two client processes 20 and 22. FIG. 2 shows a machine 24, hosting data 26 as well as one CATIA process 28, 30 for each of the client processes 20, 22. Each CATIA process contains a copy of an application 32, 34, as well as a engine 36, 38. The CATIA line of products is designed to allow an application developed under CATIA standards to operate with one of several engines; each engine is designed for one type of client process, e.g. Unix clients or Windows (trademark) clients. This makes it possible to use the same application for serving client processes running different operating systems. More specifically, as represented in FIG. 2, one copy of the same application is used for serving each client process.

The application is thus portable, inasmuch as it may be used for various types of clients running on various types of machines. As shown in FIG. 2, one CATIA process is used for each client process, even though the same data may be accessed by both processes. Each CATIA process 28, 30 would typically create its own copy of the data and care for the update of the data 26 according to amendments to the data made by client processes. This may limit the real-time sharing of data between the client processes, inasmuch as data locally amended by one client in a given CATIA process 28 may not be accessed by other client processes 22 until the application 32 in the given process 28 manages the update of data 26. In the example of FIG. 2, both CATIA processes 28, 30 are hosted on the same machine 24 as the data. One could also use separate machines; there would still be one CATIA process for each client.

Thus, there is a need for a computer system, which makes it possible to allow various clients to simply access data and in which applications would still be portable from one type of clients to the other.

SUMMARY OF THE INVENTION

According to one embodiment of the invention, there is provided a computer system for allowing at least two client processes to access data through a server process comprising an application and a engine. The engine is adapted to receive requests in a first language from one of client processes and issue responses in the first language to said one of client processes; the engine is adapted to communicate with the application in a second language distinct from the first language, the second language being an object-oriented language, with objects having properties and associated with events. The application is adapted to instantiate objects, to evaluate properties of instantiated objects based on data and to react to events. The engine is adapted to issue responses in the first language to said one of client processes according to the objects instantiated by the application and to their properties. The engine is adapted to provide updated properties and events to the application in the second language according to requests received in the first language from said one of client processes.

Preferably, the engine is further adapted to receive requests in the first language from another client process and issue responses in the first language to said another client process, and to issue responses in the first language to said another client process according to the objects instantiated by the application and to their properties. The engine may also be adapted to provide updated properties and events to the application in the second language according to requests received in the first language from said another client process.

In some embodiments, the engine is further adapted to receive requests in a third language from another client process and issue responses in the third language to said another client process, the third language being different from the first language and distinct from the second language and/or may be adapted to issue responses in the third language to said another client process according to the objects instantiated by the application and to their properties and/or to provide updated properties and events to the application in the second language according to requests received in the third language from said another client process.

Implementations of the engine may be provided with a first renderer for communicating with said client process in said first language and with a second renderer for communicating with said another client process in said third language.

In another embodiment, a client process communicates with the engine of the server process through an application process. The application process comprises: a second engine adapted to communicate with the client process; a second application adapted to communicate with the second engine; and a client interface adapted to communicate with the engine in the first language and adapted to communicate with the second application and/or with the second engine. Preferably, the first language includes html.

The invention also proposes, in another implementation, a engine for serving clients processes and allowing the clients processes to access to data managed by an application. In this implementation, the engine comprises: a first renderer adapted to receive requests from a client process in a first language and to issue responses in the first language; a second renderer adapted to receive requests from a client process in a third language and to issue responses in the third language, the third language being different from the first language; and an application interface adapted to issue and receive messages in a second language, distinct from the first language and from the third language, the second language being an object-oriented language, with objects having properties and associated with events.

The engine may be adapted to issue responses in the first language through the first renderer and responses in the third language through the second renderer according to the objects and properties contained in the messages received on the application interface; the engine is adapted to issue through the application interface messages with updated properties and events according to requests received by the first and second renders. Again, the first language may include html.

The details of one or more embodiments of the invention are set forth in the accompanying drawings and the description below. Other features, objects, and advantages of the invention will be apparent from the description and drawings, and from the claims.

DESCRIPTION OF THE DRAWINGS

A computer system embodying the invention will now be described, by way of non-limiting example, and in reference to the accompanying drawings, where.

DETAILED DESCRIPTION OF THE INVENTION

The invention proposes a computer system for allowing at least two client processes to access data through a server process. It allows data to be shared by the various client processes; in other words, the same data may be accessed at the same time by various client processes. In addition, it makes it possible for the server process to provide data access to various types of clients.

Figure 3:
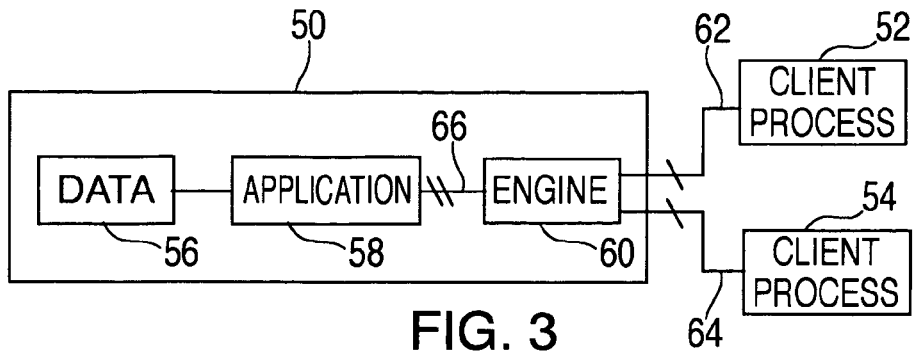
FIG. 3 is a schematic view of the architecture of a system according to the invention, with similar client processes.

FIG. 3 is a schematic view of the architecture of a system according to the invention, in an embodiment with similar client processes. It shows the server process 50 as well as two client processes 52 and 54 (two client processes are shown for the sake of simplicity; implementations may include additional client processes). From the standpoint of physical implementation, the server process and the client processes may be running on separate machines or on the same machine.

Figure 1:
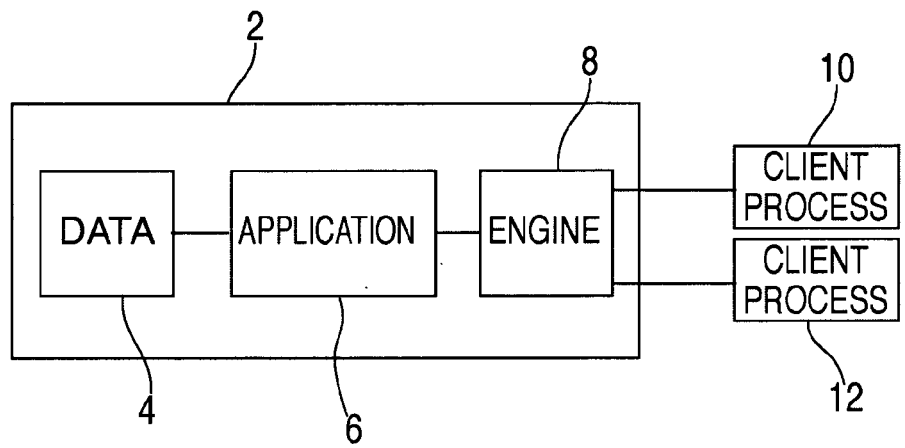
FIG. 1 is a schematic view of the architecture of a prior art server for html clients.

As shown in FIG. 3, server process 50 is used to access data 56. Server process 50 comprises an application 58 and a engine 60. Engine 60 is adapted to receive requests for one of client processes 52 and 54, in a first language. FIG. 3 shows the communication links 62, 64 between the engine and the processes. In the example of client processes similar to the ones of FIG. 1, the first language would typically comprise html and related extensions. The engine is also adapted to issue responses to one or the other of the client processes in the first language. In the example, processes 52 and 54 use the same language to communicate with engine 60—e.g. html and related technologies (this is represented by the single dash on each of links 62, 64).

The engine further communicates with the application, in a second language which is distinct from the first language (this is represented in FIG. 3 by the double dash on communication link 66 between engine 60 and application 58). The second language is distinct from the first language in that the syntax of the second language is independent from the one of the first language. Notably, the second language does not use syntax elements from the first language. Thus, any change in the first language will not reflect in the second language. The fact that the second language is distinct from the first language makes it possible to develop the application independently of the processes which are served by the engine. As discussed below in reference to FIGS. 4 and 5, one may serve different types of client processes without having to develop again the application for this type of client process or adapt the application to the client process. This is a major advantage compared to the prior art solution discussed in reference to FIG. 1. For instance, if an application is developed in JSP or ASP, it will necessarily include html parts and will solely be adapted to serve clients which are html browsers. If the same data needs to be accessed by another type of client process, the application needs to be developed anew, with a different engine.

In the example of FIG. 3, the second language is also an object-oriented language, with objects having properties and being associated with events. Apart from the advantages inherent to object languages, the choice of an object-oriented language makes it easier to provide a second language distinct from the first language. Indeed, engine 60 will receive requests from one of client processes 52, 54 in the first language; according to the content of this request, engine 60 will provide updated properties or events to application 58, or query the application for properties and events. The application will then simply receive from the engine updated properties and/or events, or requests for object's properties. According to the requests, the application will instantiate objects, evaluate properties of instantiated objects based on data and/or react to events. The updated properties, or the reaction to the events is forwarded by the application to the engine. The engine then provides an answer, in the first language, to the relevant process or processes, based on the information provided by the application.

Figure 4:
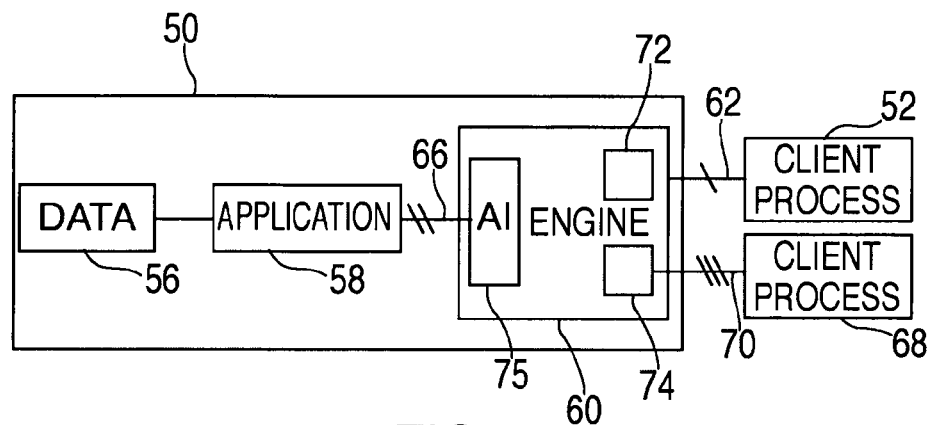
FIG. 4 is a schematic view of the architecture of a system according to the invention, with different client processes.

This amounts to separating, between application 58 and engine 60, the various aspects of the service provided by the server process to the client processes. Features specific to the type of client being served would be handled by the engine and would not be passed to the application. This may for instance include the "look and feel" offered by the service. Data and behaviour would typically be handled by the application. FIG. 4 shows different client processes in a schematic view of the architecture of a system according to the invention. FIG. 4 is similar to FIG. 3 and the same reference numbers are used wherever possible; FIG. 4 shows, instead of client process 54, a client process 68 of a type different from client process 52. Client process 68 communicates with engine 60 over communication link 70. As symbolised by the treble dash on link 70, client process 68 uses a third language to communicate with engine 60, the third language being different from the first language. For instance, the first language could be html. The third language could be adapted to Windows (trademark) clients or to Unix clients without requiring the use of a Web browser adapted to understand html. It could also be some proprietary language, as discussed below. The third language is different from the first language, but may have similarities or may have some items common with the first language. The third language is distinct from the second language, for the reasons given in reference to FIG. 3 as regards the distinction between the first and second languages.

Engine 60 of FIG. 4 has two different renderers 72 and 74. A renderer 72 or 74 is adapted to receive requests in a language—the first or third language—and to issue responses in the respective language to the relevant client. Due to the presence of separate renderers, functions of the engine 60 which are independent from the language used for addressing the client processes—e.g. communication with the application, queuing requests from client processes, etc.—need not be replicated for serving different client processes. The renderer translates clients requests and generates responses, for one, or a set of client language, thus it contains everything specific in the engine to this or this set of client language. FIG. 4 further shows the application interface 75, which is used by the engine for receiving and issuing messages in the second language.

Figure 2:
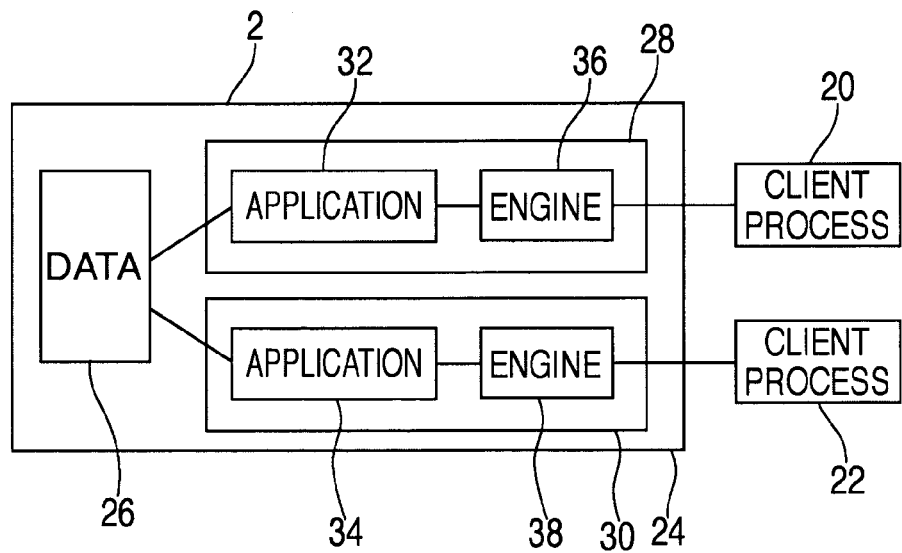
FIG. 2 is a schematic view of the architecture of a CATIA system.

Comparison of FIGS. 3 and 4 shows that there is no need in the exemplified architecture to adapt the application for serving client processes of different types. Simply by providing an additional renderer in the engine, the example of FIG. 4 makes it possible to serve different client processes. This does not imply re-developing the application. Comparison of FIGS. 4 and 2 shows that the exemplified architecture makes it possible for different client processes to address the same data, in real time. There is no need in the application to manage a copy of the data. All client processes access the same data, which may be updated contemporaneously by the various client processes.

Figure 5:
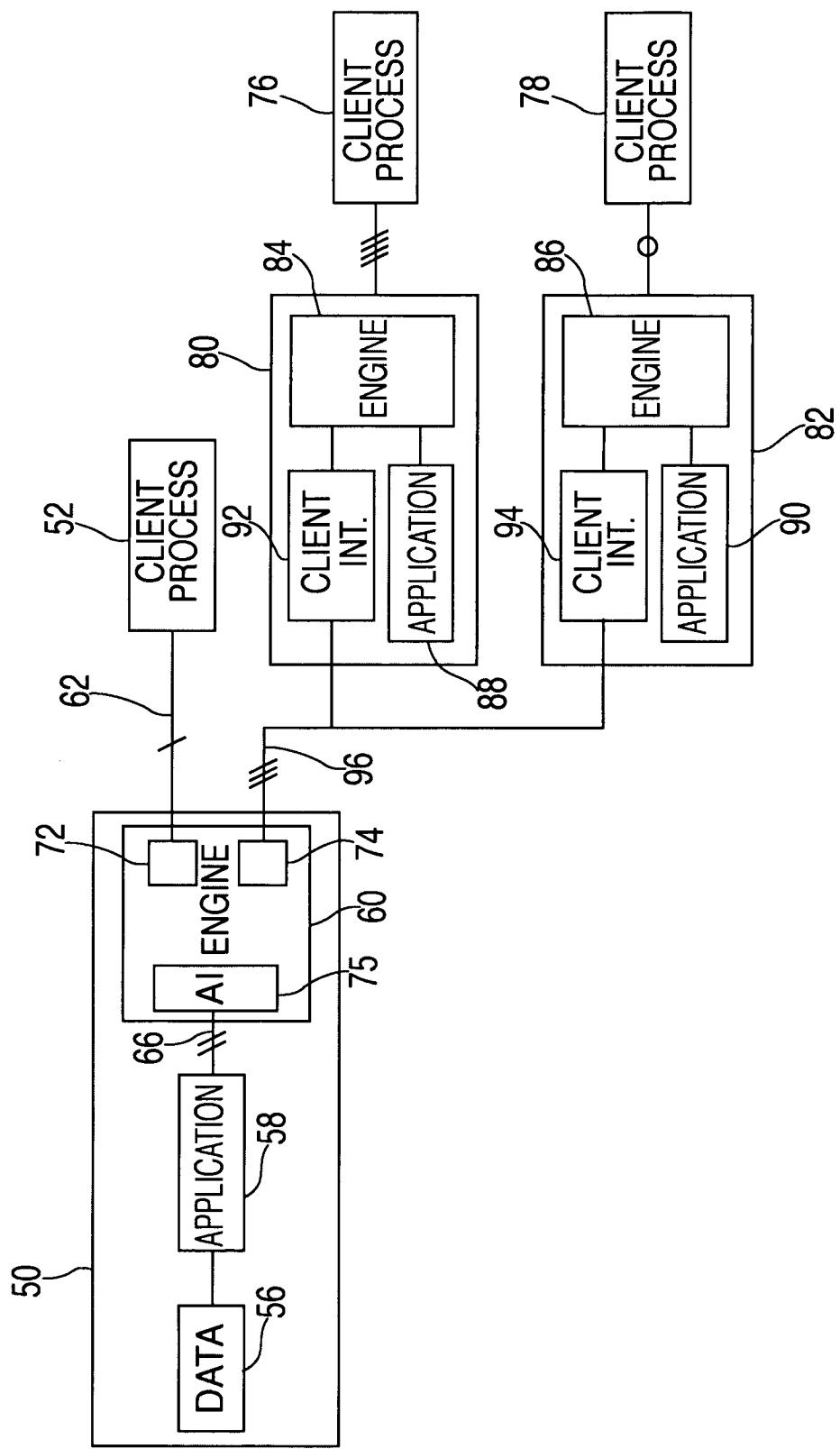
FIG. 5 is a schematic view of the architecture of another embodiment of a system according to the invention.

FIG. 5 a schematic view of the architecture of another embodiment of a system according to the invention. It shows that the architecture of FIG. 4 may also be used for allowing client processes to access data through application processes.

In FIG. 5, server process 50 and client process 52 are identical to the corresponding elements of FIG. 4 and are not fully discussed again. For the sake of explanation, application 58 is a product life cycle management application, e.g. of the type sold by Dassault Systemes under the trademark ENOVIA. The first renderer 72 of the engine is an html renderer, and is adapted to be used by client process 52, which runs a Web browser. FIG. 5 only shows one web client, but there could be more than one. This makes it possible for a html client to access the data 56 through the application 58. In the example, the html client may thus use the product life cycle management.

FIG. 5 further shows two client processes 76 and 78. For the sake of explanation, these processes are running on different platforms. Process 76 may be a Windows process and process 78 a Unix process. Client processes 76 and 78 do not access engine 60 directly, but through CATIA processes 80, respectively 82. Process 80 comprises a Windows engine 84 adapted to communicate with the Windows client process 76, while process 82 comprises a Unix engine 86 adapted to communicate with the Unix client process 78. Each process 80, 82 further comprises a CATIA application 88, 90; the associated data are not represented. Both applications may be identical. Each CATIA process 80, 82 is further provided with a client interface 92, 94 adapted to communicate with second renderer 74 of engine 60 in the third language, over communication link 96. The client interface 92, 94 communicates with its associated engine 84, 86 in the same language used between the application 88, 90 and the engine 84, 86, thus CATIA in the example.

As in FIG. 2, each client process 76, 78 may access the CATIA application 88, 90. In addition, each client process may access the ENOVIA application 58 and use the corresponding data 56. There is no need to provide an additional environment for the client process (e.g. html) for allowing access to the ENOVIA application. For the user, the ENOVIA application is usable within the environment of his usual CATIA client. Access to either CATIA or ENOVIA application is transparent for client processes 76, 78; however, there is no need to provide the client processes 76, 78 with separate accesses to the CATIA and ENOVIA applications.

The example of FIG. 5 makes it possible to address various types of clients, as in the example of FIG. 4; in addition, it allows previously developed applications (such as the exemplified CATIA applications) to be re-used. The applications 88, 90 do not need to be adapted: processes 80, 82 are simply provided with a client interface 92, 94 for addressing the engine 60. The same data 56 may be contemporaneously accessed by both client processes 76 and 78.

Another advantage of the solution of FIG. 5 is that the engine 60 of the server process 50 may be provided with only one renderer 74 for addressing client processes 76 and 78, even though these client processes are different. Indeed, engines 84 and 86 already take into account the differences between client processes 76 and 78, so that the same client interface 92, 94 may be used in the CATIA processes 80, 82. The example of FIG. 5 capitalizes on existing engines to limit the need for new developments.

Figure 6:
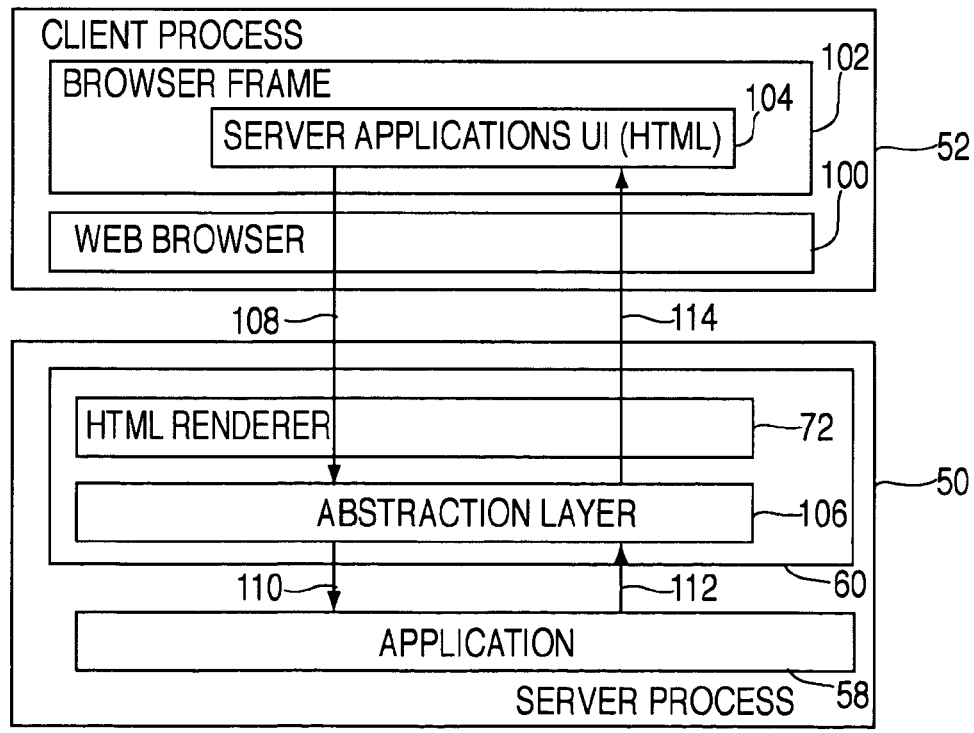
FIG. 6 is a more detailed schematic view of a system according to the invention.

FIG. 6 is a more detailed schematic view of a system according to the invention. FIG. 6 shows the example of a html client. The client process 52 contains a Web browser 100; a browser frame 102 is displayed to the client, using the server applications user interface 104, in html. The engine 60 in the server process 60 contains the html renderer 72 and an abstraction layer 106. In reaction to user's input in the user interface 104, the Web browser 100 produces URLs forwarded to the server process, e.g. on an http network such as the Internet. The URL is received by the html renderer 72 of the engine and is converted to notifications in the abstraction layer 106. This is represented on FIG. 6 by arrow 108. Abstraction layer 106 passes to the application updated object properties or events, based on the received URL, or request for updated properties. This is represented on FIG. 6 by arrow 110. As discussed above, communication between the abstraction layer 106 of the engine and the application 58 does not include html elements.

The application instantiates objects and provides properties to the abstraction layer 106, as represented by arrow 112 on FIG. 6. These are used in html renderer for providing an html page to the web browser; the page is displayed on the user interface 104, as represented by arrow 114 in FIG. 6.

Assume a sample user display contains a List of items, a text-area to enter a new value in the list and a button to validate the new value. From the point of view of the application, the content of the list of items is a set of data; the text-area is an object, the text being a property of the object; the button to validate is a second object, which is associated with an event when the user validate the button.

The generated HTML page will contain a HTML table to display part of the list (e.g. items 1 to 20 of 200), with items as cells of this table. The header of the HTML table will contain a list header hyperlink to navigate to the next part of the list. The HTML page will also contain a HTML form with a button and a text input. The HTML page is generated by the engine, based on the items provided by the application and based on the current properties of the objects. The generated HTML page is provided to the client process.

When the user clicks on the list header hyperlink to display the next part of the list of items, the web browser, using a URL generated by the engine during the first HTML page generation, starts a new HTTP request. The request is passed to the engine; the engine then obtains from the application the next part of the list of items (e.g. items 21-40). The engine generates a new HTML page containing the next part of the list of items. The properties of the objects are not updated.

Assume now that the user modifies the content of the text area to enter a new item in the list and then activates the button. The web browser starts a new HTTP request. The engine receives the request and identifies the modified content of the text-area and the activation of the button. The updated property of the text-area object is passed to the application, together with the event associated with the button. Note that this is fully independent of the HTML coding of the text-area and button in the user display.

In response to the event, the application may read the modified property of the text object and amend accordingly the data to add a new item in the list. The application provides a new part of the list of items to the engine; the engine again generates a HTML page. The example shows that the type of client process—HTML—does not influence the application, since all HTML dependent coding is carried out by the engine.

FIG. 6 evidences that the "look and feel" of the user interface is actually provided by the html renderer 72, which creates htlml pages based on information provided by the abstraction layer. This ensures that applications using the engine will all provide user interfaces on the Web browser having the same "look and feel" to the end user. Developers working on applications need not care about the browser's user interface, but may concentrate on the actual application.

The use of a renderer also makes it possible to change the "look and feel" of the user interface; it is only necessary to change the renderer to change the user interface. For instance, colours, fonts other similar features of the user interface are defined in the renderer. These may be changed by amending the renderer or providing a new renderer, without amending or changing the application itself. Another way to customize a user interface is to provide different sets of html static resources—CSS or images—for the renderer. Changing the static resources changes the look of the user interface, without having to redevelop the renderer.

The invention may be reproduced by the person skilled in the art using techniques known per se in the art of programming. As discussed above, the language used for communication between the engine and the client processes may comprise html and related technologies. The language used for communication between the engine and the application processes in the example of FIG. 5 may be a proprietary language, similar to the language used for communication within the server process between the engine and the application. This proprietary language may be made of a set of classes defined in the Java Language, and an XML grammar.

The invention may be embodied in programs having routines for carrying out the various steps discussed in reference to the figures.

The invention is not limited to the examples and embodiments discussed in reference to the figures. "Server" should be understood in a logical meaning, as the computer system containing the data and running the application and the engine. It may actually be embodied in various machines—e.g. a separate machine for containing the data—or in a single computer. Requests and responses are not representative of url requests and html responses, but are merely representative of the flow of messages to and from the server. "Requests" are applied to the server by the user machine or process; "responses" are received from the server by the user machine or process. In the figures, data 56 is represented, for the sake of simplicity, within the server process; however, one could also consider that the data is not part of the server process. This is irrelevant as regards the operation of the invention.

The examples of FIGS. 3 and 4 only show two client processes for the sake of simplicity; the system may comprise more client processes, of various or similar types. Implementation is not discussed in detail in FIGS. 3-5. Indeed, many different solutions may be used for embodying the processes of the system. Similarly, physical implementation of the links between the various processes may be very different. In the examples of FIG. 5, links 62 and 96 could be carried over an Intranet or Internet network. Application processes 80 and 82 could be running on the same machine. Client processes could be running on distant terminals connected to the machine. The engine may be sold as a separate product, or as a part of a complete system.

A number of embodiments of the present invention have been described. Nevertheless, it will be understood that various modifications may be made without departing from the spirit and scope of the invention. Accordingly, other embodiments are within the scope of the following claims.

What is claimed is:

1. A computer-readable storage medium comprising instructions stored thereon that when executed by at least one computer, they cause said at least one computer to: allow at least two client processes to access data through a server process, said server process stored in said medium and comprising an application managing said data and an engine, wherein the engine is adapted to receive requests in a first language from one of client processes and issuing responses in the first language to said one of client processes, and the engine is adapted to communicate with the application in a second language distinct from the first language, the second language being an object-oriented language, with objects having properties and associated with events; and the application is adapted to instantiate objects, to evaluate properties of instantiated objects based on data and to react to events, in response to said engine communicating with said application; and wherein the engine is adapted to issue responses in the first language to said one of client processes according to the objects instantiated by the application and to their properties; and the engine is adapted to provide updated properties of said objects and events to the application in the second language according to requests received in the first language from said one of client processes.

2. The computer-readable storage medium of claim 1, wherein:

the engine is further adapted to receive requests in the first language from another client process and issue responses in the first language to said another client process;

the engine is adapted to issue responses in the first language to said another client process according to the objects instantiated by the application and to their properties; and the engine is adapted to provide updated properties and events to the application in the second language according to requests received in the first language from said another client process.

3. The computer-readable storage medium of claim 2, wherein said instructions further cause said at least one computer to allow a client process to communicates with the engine of the server process through an application process stored in said medium, said application process comprising:
 a second engine adapted to communicate with the client process;
 a second application adapted to communicate with the second engine; and
 a client interface adapted to communicate with the engine in the first language and adapted to communicate with the second application and/or with the second engine.

4. The computer-readable storage medium of claim 1, wherein the engine is further adapted to receive requests in a third language from another client process and issue responses in the third language to said another client process, the third language being different from the first language and distinct from the second language;

the engine is adapted to issue responses in the third language to said another client process according to the objects instantiated by the application and to their properties; and the engine is adapted to provide updated properties and events to the application in the second language according to requests received in the third language from said another client process.

5. The computer-readable storage medium of claim 4, wherein the engine is provided with a first renderer for communicating with said client process in said first language and with a second renderer for communicating with said another client process in said third language.

6. The computer-readable storage medium of claim 4, wherein said instructions further cause said at least one computer to allow a client process to communicates with the engine of the server process through an application process stored in said medium, said application process comprising:
 a second engine adapted to communicate with the client process;
 a second application adapted to communicate with the second engine; and
 a client interface adapted to communicate with the engine in the first language and adapted to communicate with the second application and/or with the second engine.

7. The computer-readable storage medium of claim 2, wherein the engine is further adapted to receive requests in a third language from another client process and issue responses in the third language to said another client process, the third language being different from the first language and distinct from the second language;

the engine is adapted to issue responses in the third language to said another client process according to the objects instantiated by the application and to their properties;

the engine is adapted to provide updated properties and events to the application in the second language according to requests received in the third language from said another client process.

8. The computer-readable storage medium of claim 7, wherein the engine is provided with a first renderer for communicating with said client process in said first language and with a second renderer for communicating with said another client process in said third language.

9. The computer-readable storage medium of claim 7, wherein said instructions further cause said at least one computer to allow a client process to communicates with the engine of the server process through an application process stored in said medium, said application process comprising:
 a second engine adapted to communicate with the client process;
 a second application adapted to communicate with the second engine; and
 a client interface adapted to communicate with the engine in the first language and also adapted to communicate with the second application and or with the second engine.

10. The computer-readable storage medium of claim 1, wherein said instructions further cause said at least one computer to allow a client process to communicates with the engine of the server process through an application process stored in said medium, said application process comprising:
 a second engine adapted to communicate with the client process;
 a second application adapted to communicate with the second engine; and
 a client interface adapted to communicate with the engine in the first language and adapted to communicate with the second application and/or with the second engine.

11. The computer-readable storage medium of claim 1, wherein the first language includes html.

12. The computer-readable storage medium of claim 1, wherein the application is a computer-aided design application.

13. A computer system for allowing at least two client processes to access data through a server process, said server process comprising an application managing said data and an engine, said computer system comprising:
 one or more programmable processors;

one memory storage device; and one input device; and wherein the engine is adapted to receive requests in a first language from one of client processes and issuing responses in the first language to said one of client processes, and the engine is adapted to communicate with the application in a second language distinct from the first language, the second language being an object-oriented language, with objects having properties and associated with events; and the application is adapted to instantiate objects, to evaluate properties of instantiated objects based on data and to react to events, in response to said engine communicating with said application; and wherein the engine is adapted to issue responses in the first language to said one of client processes according to the objects instantiated by the application and to their properties; and the engine is adapted to provide updated properties of said objects and events to the application in the second language according to requests received in the first language from said one of client processes.

14. The system of claim 13, wherein:

the engine is further adapted to receive requests in the first language from another client process and issue responses in the first language to said another client process;

the engine is adapted to issue responses in the first language to said another client process according to the objects instantiated by the application and to their properties; and the engine is adapted to provide updated properties and events to the application in the second language according to requests received in the first language from said another client process.

15. The system of claim 14, wherein a client process communicates with the engine of the server process through an application process, said application process comprising:

a second engine adapted to communicate with the client process;

a second application adapted to communicate with the second engine; and a client interface adapted to communicate with the engine in the first language and adapted to communicate with the second application and/or with the second engine.

16. The system of claim 13, wherein the engine is further adapted to receive requests in a third language from another client process and issue responses in the third language to said another client process, the third language being different from the first language and distinct from the second language;

the engine is adapted to issue responses in the third language to said another client process according to the objects instantiated by the application and to their properties; and the engine is adapted to provide updated properties and events to the application in the second language according to requests received in the third language from said another client process.

17. The system of claim 16, wherein the engine is provided with a first renderer for communicating with said client process in said first language and with a second renderer for communicating with said another client process in said third language.

18. The system of claim 16, wherein a client process communicates with the engine of the server process through an application process, said application process comprising:

a second engine adapted to communicate with the client process;

a second application adapted to communicate with the second engine; and a client interface adapted to communicate with the engine in the first language and adapted to communicate with the second application and/or with the second engine.

19. The system of claim 14, wherein the engine is further adapted to receive requests in a third language from another client process and issue responses in the third language to said another client process, the third language being different from the first language and distinct from the second language;

the engine is adapted to issue responses in the third language to said another client process according to the objects instantiated by the application and to their properties;

the engine is adapted to provide updated properties and events to the application in the second language according to requests received in the third language from said another client process.

20. The system of claim 19, wherein the engine is provided with a first renderer for communicating with said client process in said first language and with a second renderer for communicating with said another client process in said third language.

21. The system of claim 19, wherein a client process communicates with the engine of the server process through an application process, said application process comprising:

a second engine adapted to communicate with the client process;

a second application adapted to communicate with the second engine; and a client interface adapted to communicate with the engine in the first language and also adapted to communicate with the second application and or with the second engine.

22. The system of claim 13, wherein a client process communicates with the engine of the server process through an application process, said application process comprising:

a second engine adapted to communicate with the client process;

a second application adapted to communicate with the second engine; and a client interface adapted to communicate with the engine in the first language and adapted to communicate with the second application and/or with the second engine.

23. The system of claim 13, wherein the first language includes html.

24. The system of claim 13, wherein the application is a computer-aided design application.

* * * * *